United States Patent [19]

Kumagai

[11] Patent Number: 5,023,729
[45] Date of Patent: Jun. 11, 1991

[54] METHOD AND SYSTEM FOR GENERATING A DENSITY CONCURRENT MATRIX

[75] Inventor: Ryohei Kumagai, Tokyo, Japan
[73] Assignee: Ezel, Inc., Tokyo, Japan
[21] Appl. No.: 333,910
[22] Filed: Apr. 6, 1989
[30] Foreign Application Priority Data Apr. 21, 1988 [JP] Japan .................................. 63-99080

[51] Int. Cl.⁵ ............................................ H04N 1/387
[52] U.S. Cl. .................................. 358/457; 358/455; 358/460
[58] Field of Search ............... 358/443, 455, 457, 458, 358/447, 460, 406, 444, 445; 382/4, 34

[56] References Cited

U.S. PATENT DOCUMENTS

| 4,528,693 | 7/1985 | Pearson et al. | 358/460 |
| 4,682,869 | 7/1987 | Itoh et al. | 358/447 |
| 4,725,892 | 2/1988 | Suzuki et al. | 358/451 |
| 4,748,515 | 5/1988 | Van Daele et al. | 358/447 |

OTHER PUBLICATIONS

Weszka et al., A Comparative Study of Texture Measures for Terrain Classification, IEEE Transactions on Systems, Man and Cybernetics, vol. SMC-6, No. 4, Apr. 1976.

Primary Examiner—Howard W. Britton
Assistant Examiner—Kim Yen Vu
Attorney, Agent, or Firm—Cushman, Darby & Cushman

[57] ABSTRACT

An image processing method and apparatus generates a concurrence matrix for identifying characteristics in an image. Pixel density values of an original image are stored, and a shifted image is generated by shifting the pixels of the original image by a predetermined distance. A set of counts is generated. Each count corresponds to one density value selected out of the range of possible densities. Each count is the number of times that a pixel in the shifted image equals the selected density simultaneously with a corresponding pixel in the original image equaling a predetermined value. One column in the correspondence matrix corresponds to the counts for one predetermined value. The shift distance is varied to generate a set of matrices. From these matrices, contrast, texture and other characteristics in an image can be quantitatively recognized.

8 Claims, 7 Drawing Sheets

METHOD AND SYSTEM FOR GENERATING A DENSITY CONCURRENT MATRIX

FIELD OF THE INVENTION

The present invention relates to an image processing method, particularly to a method for generating a density concurrent matrix and application thereof.

BACKGROUND OF THE INVENTION

In a density concurrent matrix, the relationship of densities between two pixels in an image is stored, which are remote from each other by predetermined distance. The distance is usually defined as δ (x,y), and it means coordinate differences x in x direction and coordinate difference y in y direction. Each element in the density concurrent matrix represents a number of couples of densities, that is, on the $d_1$th column and $d_2$th row, the number of couples of densities $d_1$ and $d_2$ is stored. A matrix is proposed by Haralick, in which the summation of the number of couples of densities $d_1$ and $d_2$, as well as the number of couples of densities $d_2$ and $d_1$ are stored in the same column and same row.

As far as the inventor knows, there has been disclosed no concrete method for generating the density concurrent matrix. If all couples in an image are compared in density, N comparisons are necessary for an image of N pixels. When the image size is 512×512, more than 260 thousands times comparation is necessary. It takes several minutes for a 16-bit personal computer to execute the comparisons.

Characteristics parameters; contrast, second moment correlation etc.; are usually calculated from the density concurrent matrix. There is disclosed no concrete method for calculating such parameters.

SUMMARY OF THE INVENTION

The present invention has an object to provide a method for generating density concurrent matrices efficiently.

According to the present invention, an image shifted by predetermined distance δ (x,y) is generated from an original image, a comparator is provided for generating an object pixel flag when a pixel in the original image has a predetermined density. A counter is provide for increasing data in an address designated by the density of a pixel in the shifted image. By the processing above, a column or a row of the density concurrent matrix is generated.

BRIEF DESCRIPTION OF DRAWINGS

FIG. 2(a) to (d) show images to be processed;

PREFERRED EMBODIMENT OF THE PRESENT INVENTION

Exemplary preferred embodiments of the image processing method according to the present invention will be described in detail hereinafter.

Figure 1:
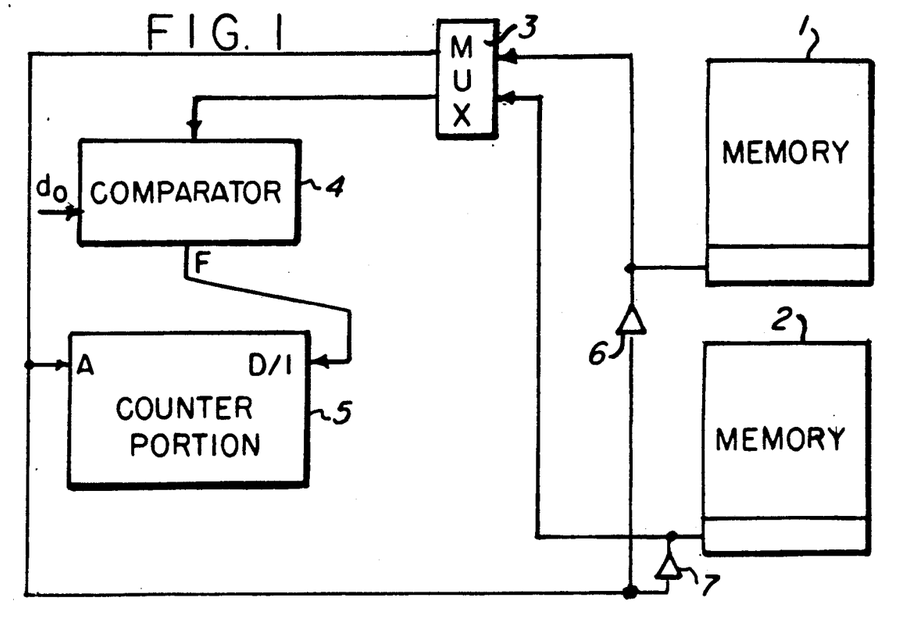
FIG. 1 is a block diagram of a circuit used for the first embodiment of the present invention.

FIG. 1 shows a circuit used for the first embodiment of the present invention. In the circuit, two or more frame memories 1 and 2 are connected through a multiplexer 3 to a comparator 4 and counter portion 5, successively. An output of the multi-plexer 3 is fed back to the frame memories 1 and 2.

Figure 2A:
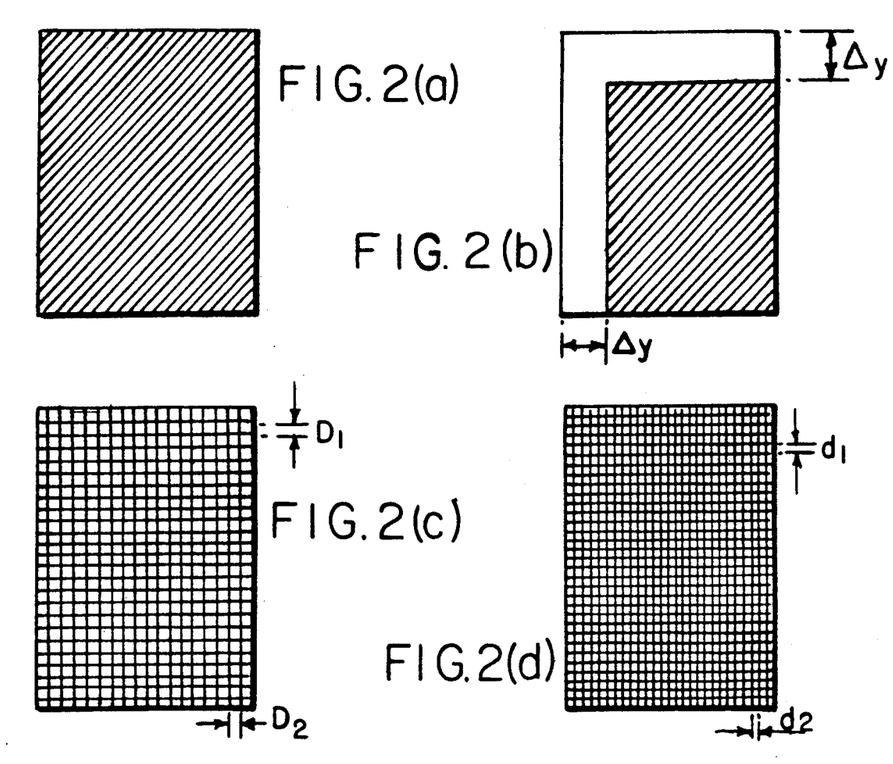

In the memory 1, an original image to be processed is stored first. The original image is represented by FIG. 2(a). When the shift distance of density concurrent matrix is δ (x,y), the original image is shifted by x in the x direction and by y in the y direction and stored in the frame memory 2. In FIG. 2, the positive x is rightward direction and the positive y direction is downward. For shifting an image, read timing from the frame memory 1 and write timing to the frame memory 2 are shifted. Any other methods can be applied. The density of each pixel in the original image is successively transmitted to the comparator 4. The density of each pixel in the shifted image is successively transmitted to the counter portion 5, synchronously with the transmission of the density of the original image.

In the comparator 4, a density $d_0$ to be processed is registered. The comparator 4 outputs a signal F only when the density of the pixels in the original image coincides with $d_0$. F is called "objective pixel flag" hereinafter.

The counter 5 has an address input A and data input D/I. Data stored in an address designated by an address input A is increased by a value inputted from D/I.

The objective pixel flag F has a value of "1", which is input to D/I of the counter portion 5. It means that the counter 5 counts the number of times each density is input from the shifted image. Therefore, density couples of $d_0$ and each of all densities are counted. This corresponds to the generation one column or one row of the density concurrent matrix. By changing $d_0$ to each of all densities, all elements of density concurrent matrix are calculated.

Usually the density concurrent matrix is generated according to an image diminished in gradation from an original image. In this case, $d_0$ is changed 15 times.

For a process of one column or one row, all data of the frame memories 1 and 2 are input once into the comparator 4 and counter portion 5, respectively. This can be called one scan process. In a 16 gradation image, the total process is performed in 16 scans.

There exist frame memories which read and write 512×512 pixels in 1/60 sec.; 0.016 sec.

From a density concurrent matrix, the following characteristics parameters are calculated.

Contrast $x1(\delta)$:

$$x1(\delta) = \sum_m \sum_n (m - n)^2 P\delta(m,n)$$

Second moment $x2(\delta)$:

$$x2(\delta) = \sum_m \sum_n P\delta(m,n)^2$$

Correlation $x3(\delta)$:

-continued $$x3(\delta) = \left( \sum_m \sum_n mnP\delta(m,n) - \mu_m\mu_n \right) / (\delta m \delta n)$$

$$\mu m = \sum_m m \sum_n P\delta(m,n)$$

Mean value of peripheral distribution in m direction;

$$\mu n = \sum_n n \sum_m P\delta(m,n)$$

Mean value of peripheral distribution in n direction;

$$\sigma^2 m = \sum_m (m - \mu n)^2 \sum_n P\delta(m,n)$$

Variance of peripheral distribution in m direction;

$$\sigma^2 n = \sum_n (n - \mu n)^2 \sum_m P\delta(m,n)$$

Variance of peripheral distribution in n direction;

It will be easily understood from the above formulas that the calculation above are very complex.

For evaluating a density concurrent matrix without executing complex calculation, a characteristics parameter is invented by the present inventor.

Figure 3:
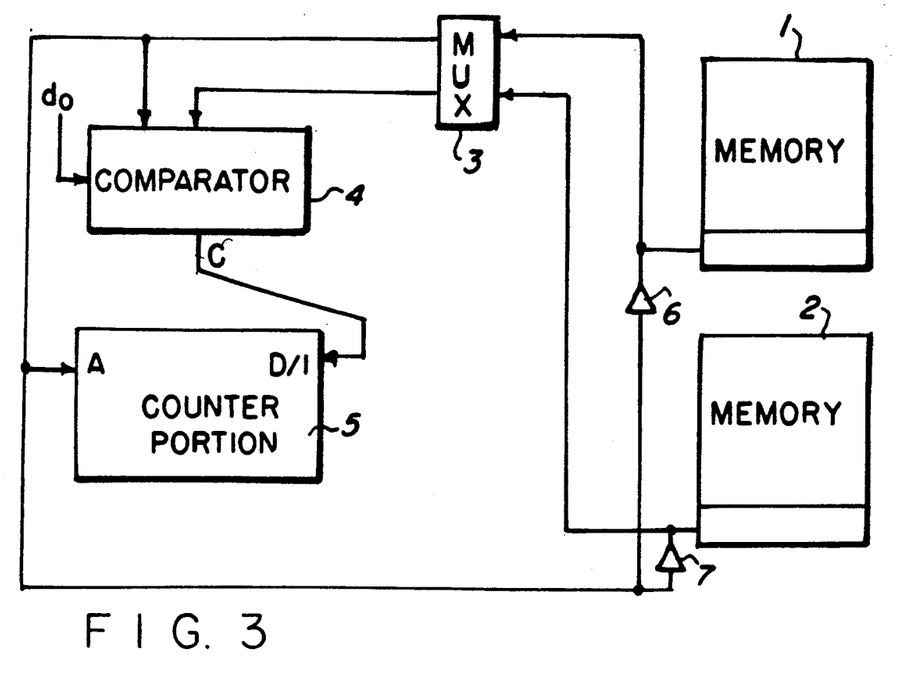
FIG. 3 shows a block diagram of a circuit used for the second embodiment of the present invention.

For calculating the new parameter, a shifted image is generated, similar to the above process, by a distance $\delta$ (x,y). FIG. 3 shows a circuit for the calculation. The circuit is similar to that in FIG. 1, but is different in that data from both the frame memories 1 and 2 are input in parallel to the comparator 4. The comparator 4 outputs a comparison signal C. The signal C is "0" when both data coincide with each other, and is "1" when both data are different from each other. The comparison signal C is input to the data input D/I of the counter 5 which counts the value of the signal C. A constant value, for example "0", is input to the address input A of the counter 5, so that the total counted value is stored in one address.

The original image in FIG. 2(c) has a rough checked pattern with horizontal pitch D2 and vertical pitch D1. On comparing the original image with the shifted image, the discordance ratio of both images has a local minimum or becomes "0" when the shift distance in the x direction is a multiple of D2 and/or the shift distance in the y direction is a multiple of D1.

In FIG. 2(d), a fine checked image is shown with the pitch of d1 in the y direction and d2 in the x direction. On comparing the image in FIG. 2(d) with the shifted image thereof, the discordance ratio becomes "0" or local minimum when the shift distance in the x direction is a multiple of d2 and/or the shift distance in the y direction is a multiple of d1.

As will be understood from the description above, the period of the discordance ratio represents a texture characteristics. This period is independent from the density itself; rather, it represents the roughness or fineness of the texture. It means that a human impression of a texture can be quantitatively evaluated. Since the evaluation is performed by a more simple calculation than for the conventional parameters, the texture analysis is more easily executed.

Figure 4:
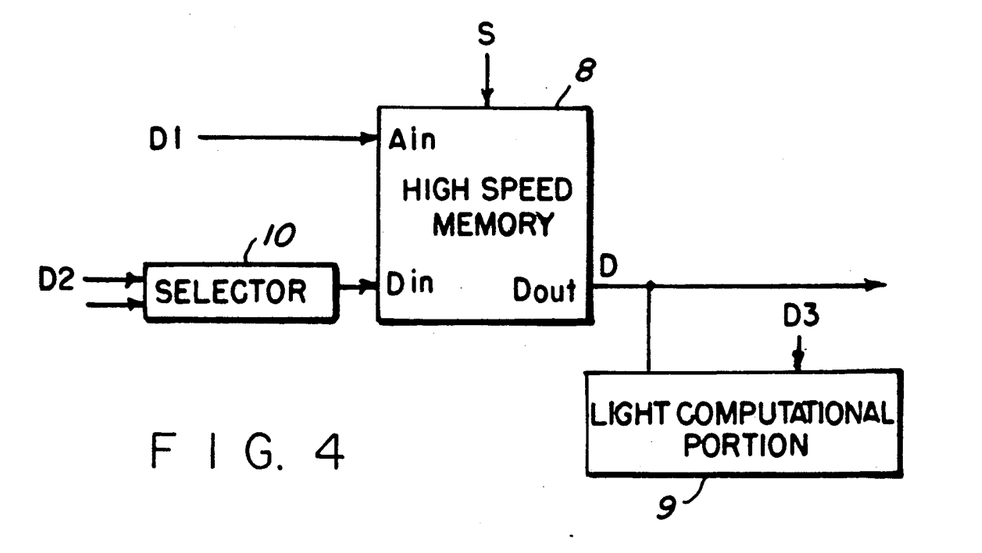
FIG. 4 shows a block diagram of the first embodiment of a counter portion.

FIG. 4 shows an example of the counter portion 5 in the above circuit. The counter portion 5 consists of a high speed memory 8 and a light computational portion 9 which is connected to the data output Dout of the high speed memory 8. The high speed memory 8 consists of, for example, a static RAM (random access memory). The output of the light computational portion 9 is fed back through a selector 10 to the data input D/I of the high speed memory 8. The address input A of the counter 5 is connected to the address input Ain of the high speed memory 8. The data input D/I of the counter 5 is input as the data D3 of the light computational portion 9. When the high speed memory 8 is in a read mode, the high speed memory 8 outputs data D stored in the address D1 which is designated by the address input A. The data D is input to the light computational portion 9. The light computational portion can be defined by various computational modes. For the performance as a counter, the light computational portion 9 is defined as an adder. Therefore, D3 is added to D, then the additional result (D3+D) is output from the light computational portion 9. The output value is input through the selector 10 to the data input Din of the high speed memory 8 and stored in the address D1. Since D3 is "1", data in an address of the high speed memory 8 is increased by "1" in every process cycle.

The counter 5 has the same performance as above by inputting a constant "1", as D3 as well as inputting a signal F or C to a chip select terminal or a chip enable terminal of the high speed memory 8.

Figure 5:
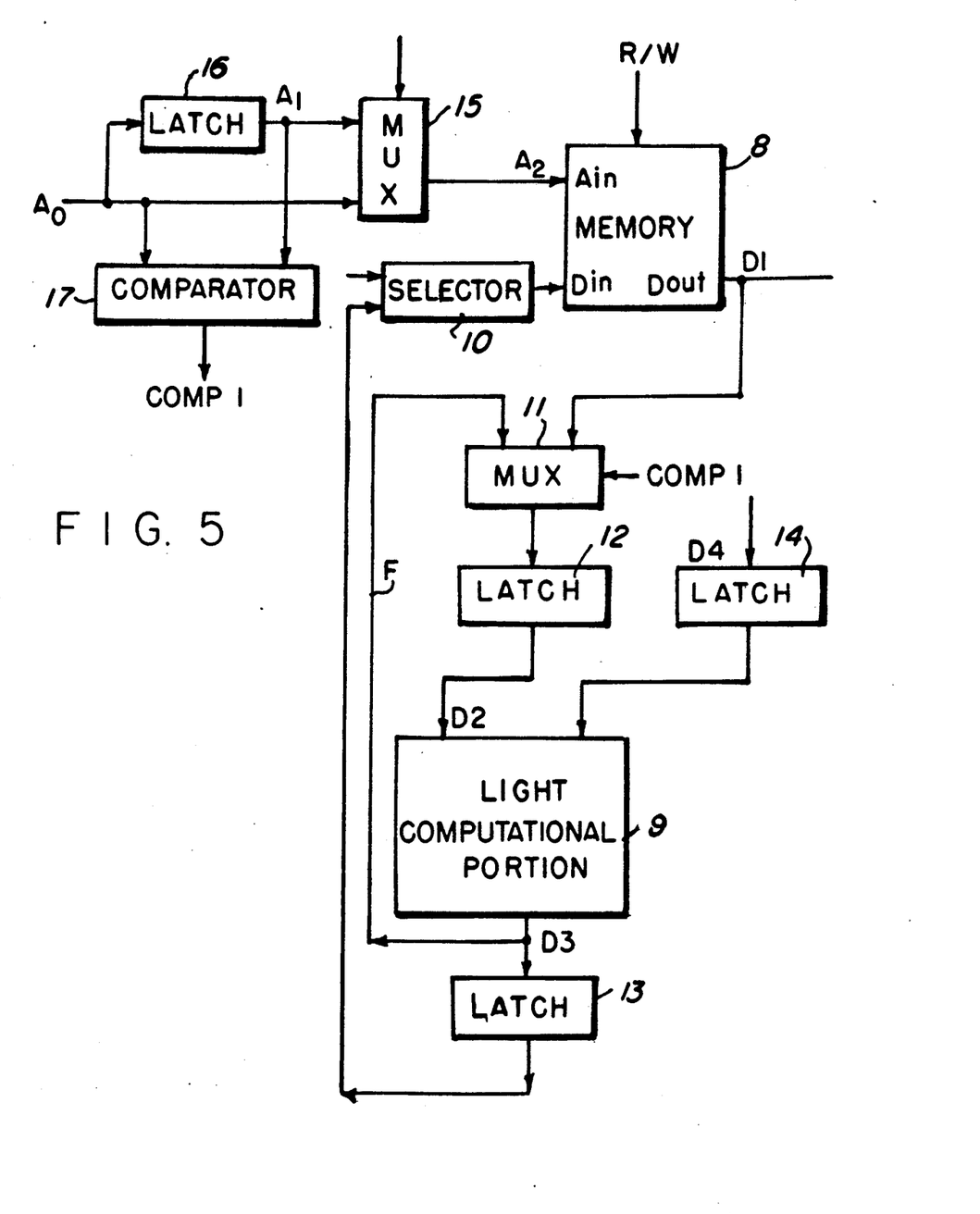
FIG. 5 shows the second embodiment of the counter portion.

FIG. 5 shows the second embodiment of the counter.

In FIG. 5, the counter consists of the high speed memory 8, the light computational portion 9 connected to the data output of the high speed memory, and the selector 10 connected to the data input of the high speed memory 8. The output of the light computational portion 9 is transmitted to the input of the selector 10. A multi-plexer 11 and a latch 12 are successively connected between the high speed memory 8 and the light computational portion 9. The output from the high speed memory 8 is transmitted through the multi-plexer 11 and the latch 12 to the light computational portion 9. A latch 13 is connected between the light computational portion 9 and the selector 10. The output of the light computational portion 9 is transmitted through the latch 13 to the selector 10. The output of the light computational portion 9 is fed through a feed back line F back to the multi-plexer 11. The multi-plexer11 selects data D1 or the output D3 alternatively as an output. A latch 14 is connected to another input of the light computational portion 9. Data D4 to be used for the calculation with the data D1 is once held in the latch 14 then input to the light computational portion 9.

A multi-plexer 15 is connected to the address input of the high speed memory 8. An address signal A0 is input directly or through a latch 16 to the multi-plexer 15. The direct address signal A and the address signal A1 through the latch 16 are input to a comparator 17. The comparator 17 compares the signals A and A1 so as to output comparison signal COMP1 representing the comparison result.

Figure 6:
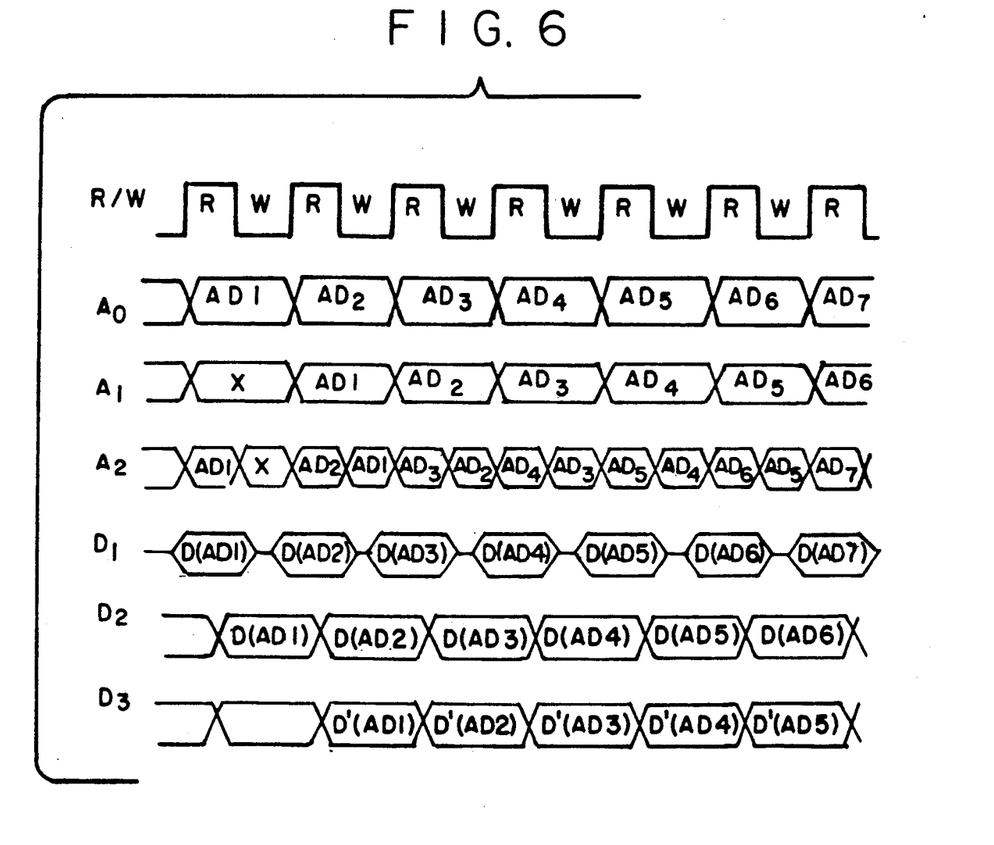
FIG. 6 and 7 show timing charts of the second embodiment.

FIG. 6 shows a timing chart of the pipeline process of the counter portion 5. Read/write enable signal R/W of the high speed memory 8 is changed periodically so as to make the high speed memory 8 read and write periodically. The signal R/W is used as a basic signal of the counter 5. The address signal A0 is repeatedly input in every read/write cycle (one read cycle and one write cycle) so as to designate one address in every read/write cycle. The latch 16 outputs the signal A1 which is generated by delaying the signal A1 by one read/write cycle. The multi-plexer 15 alternatively outputs the signal A0 and A1 in every half of read/write cycle (one read cycle or one write cycle). The output of the multi-plexer 15 is input to the address input of the high speed memory. The high speed memory 8 outputs, from the data output Dout, the data in the address designated by A2.

When different addresses are designated in every read/write cycle, as shown by the references from AD1 to AD7 in FIG. 6, output data D1 is transmitted through the multi-plexer 11 and latch 12 to the light computational portion 9, then the computational result D3 is transmitted through the latch 13 and selector 10 to the high speed memory 8. The result D3 is stored in the same address as the address from which D1 is read out. As shown in FIG. 6, in the write cycle following the read cycle when address AD1 is designated, the address AD1 is designated again in the write cycle. Therefore, the computational result D3 is written in the same address as the address from which D1 is read out.

When a constant address is repeatedly designated, the first computational result has not yet be written in the second read cycle, in the process timing in FIG. 6. It means that a repeated calculation is performed once in every 2 read/write cycle.

Figure 7:
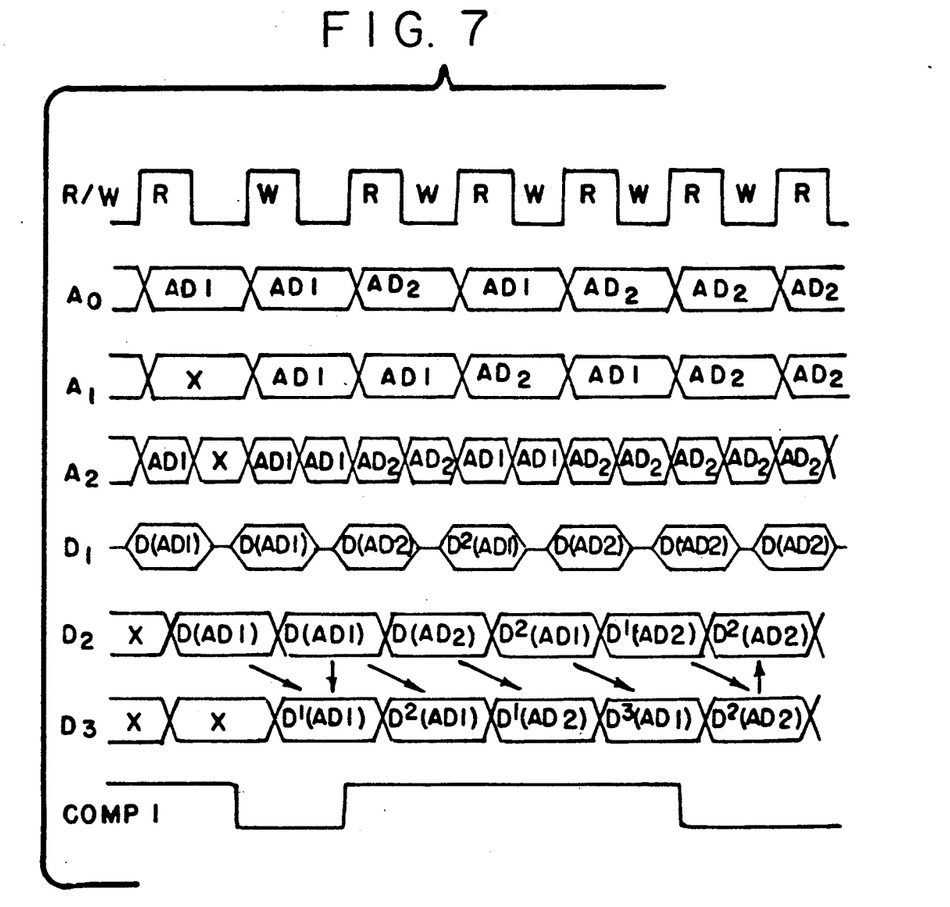

For the repeated calculation, the feedback line F is used for feeding the output of the light computational 8 immediately back to the latch 12. FIG. 7 shows a timing chart for the repeated calculation of the same address. In FIG. 7, address AD1 is designated 2 times continuously and another address AD2 is designated at the third cycle, then the address AD1 is designated again at the fourth cycle. From the fifth cycle, the address AD2 is repeatedly designated. The comparator 17 compares addresses A0 and A1 and generates the signal COMP1 of low level when A0 and A1 coincide with each other. COMP1 is input as a control signal to the multi-plexer 11. The multi-plexer 11 passes the data from the feedback line F when COMP1 a low level. The data from the multi-plexer is immediately transmitted through the latch 12 to the light computational portion 9. The light computational portion outputs the computational result at the next cycle. By the first and second designation of AD1, the data in the address AD1 is calculated in the light computational portion 9, for example increased by "1", then the calculation result is fed through the feedback loop to the light computational portion 9. The light computational portion 9 calculates a second calculation of the data from the address AD1 and transmits the second calculation result to the address AD1 in the high speed memory 8. By the first designation of AD2, data in the address AD2 is calculated in the light computational portion 9, and the calculation result is written in the address AD2. At the next designation of AD1 (fourth cycle), data in the address AD1 is calculated once in the light computational portion 9, then the calculation result is written in the address AD1. From the fifth cycle, the feed back line F is used again so that the data in the address AD2 is repeatedly calculated, circulating in the feed back loop.

As will be understood from the description above, data in the same address can be repeatedly calculated in every read/write cycle by using the feed back line F.

Figure 8:
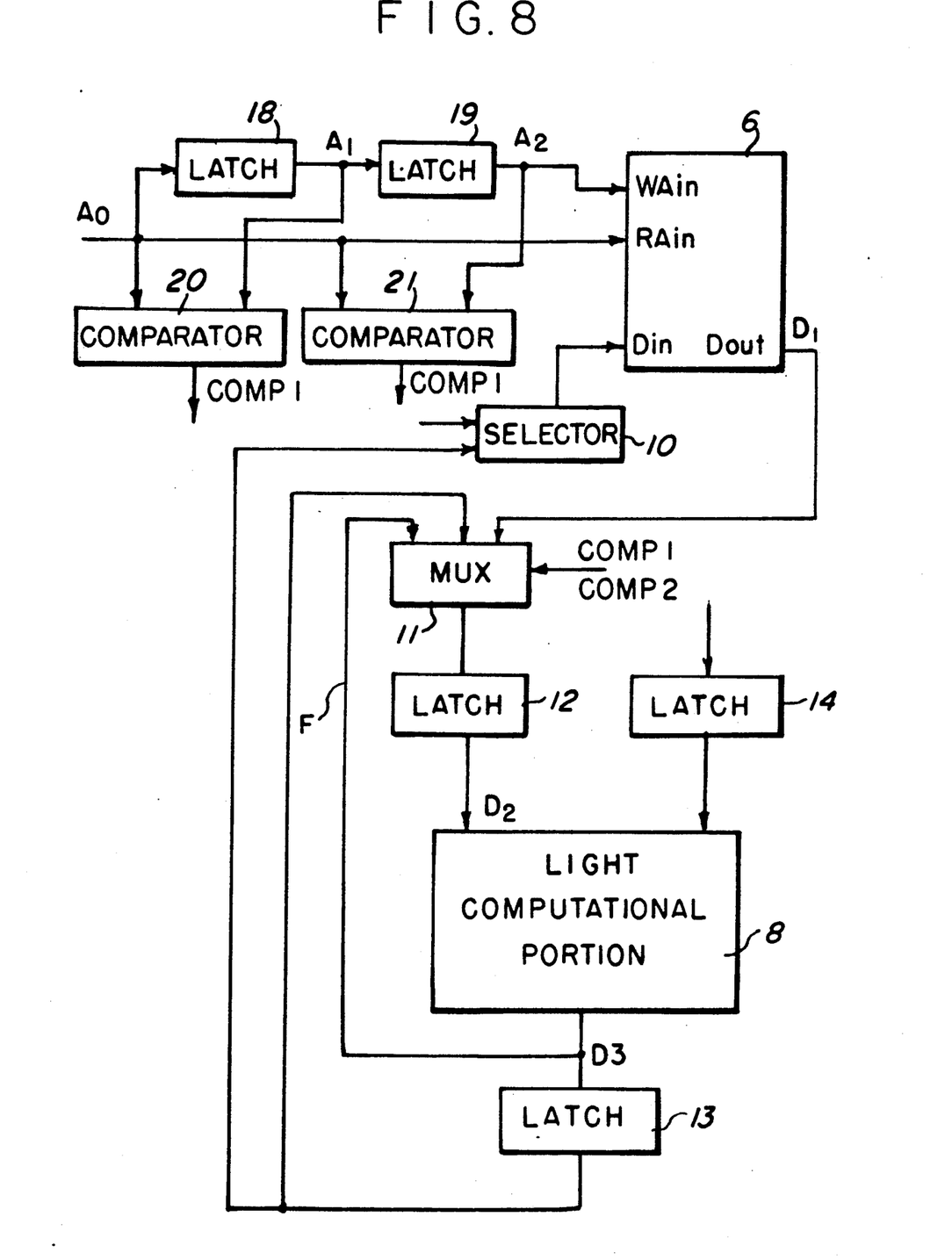
FIG. 8 shows a block diagram of the third embodiment of the counter portion.

FIG. 8 shows the third embodiment of the counter portion in which a dual port memory or other multi-port memory is used as the high speed memory. The multi-port memory has advantages in that reading and writing are simultaneously performed. In this embodiment, portions same as or corresponding to those of the second embodiment are designated by the same reference numerals those of the second embodiment.

In FIG. 8, the multi-plexer 11 connected to the output of the high speed memory has three inputs. The output of the latch 13 is fed through a feed back line F' back to the multi-plexer 11. The multi-plexer 11 selects either the output D1 from memory, the output from the light computational portion 8 or the output from the latch 13, alternatively.

Data A0 is directly input to the read address input RAin of the memory 8. Data A0 is input through latches 18 and 19 successively to the write address input WAin. The signal for WAin is like signal A0 but delayed by two read/write cycles. This delayed signal is called A2 hereinafter. The output of the latch 18 is like signal A0 but delayed by one read/write cycle, which delayed signal is called A1 hereinafer.

Signal A0 and A1 are compared in a comparator 20 and signals A0 and A2 are compared in a comparator 21. The comparators; 20 and 21 output comparison signals COMP1 and COMP2, respectively. COMP1 and COMP2 are input as control signals to the multi-plexer 11. COMP1 becomes a low level ("0") when A0 and A1 coincide with each other, it is a otherwise a high level ("1"). COMP2 becomes a low level ("0") when A0 and A2 coincide with each other, otherwise it is a high level ("1"). In this case, multi-plexer 11 selects data according to COMP1 and COMP2 as shown in Table 1.

TABLE 1

| COMP1 | COMP2 | Output from multi-plexer 11 |
|---|---|---|
| 0 | 0 | Data from feed back line F |
| 0 | 1 | Same as the above |
| 1 | 0 | Data from feed back line F' |
| 1 | 1 | Data D1 |

Figure 9:
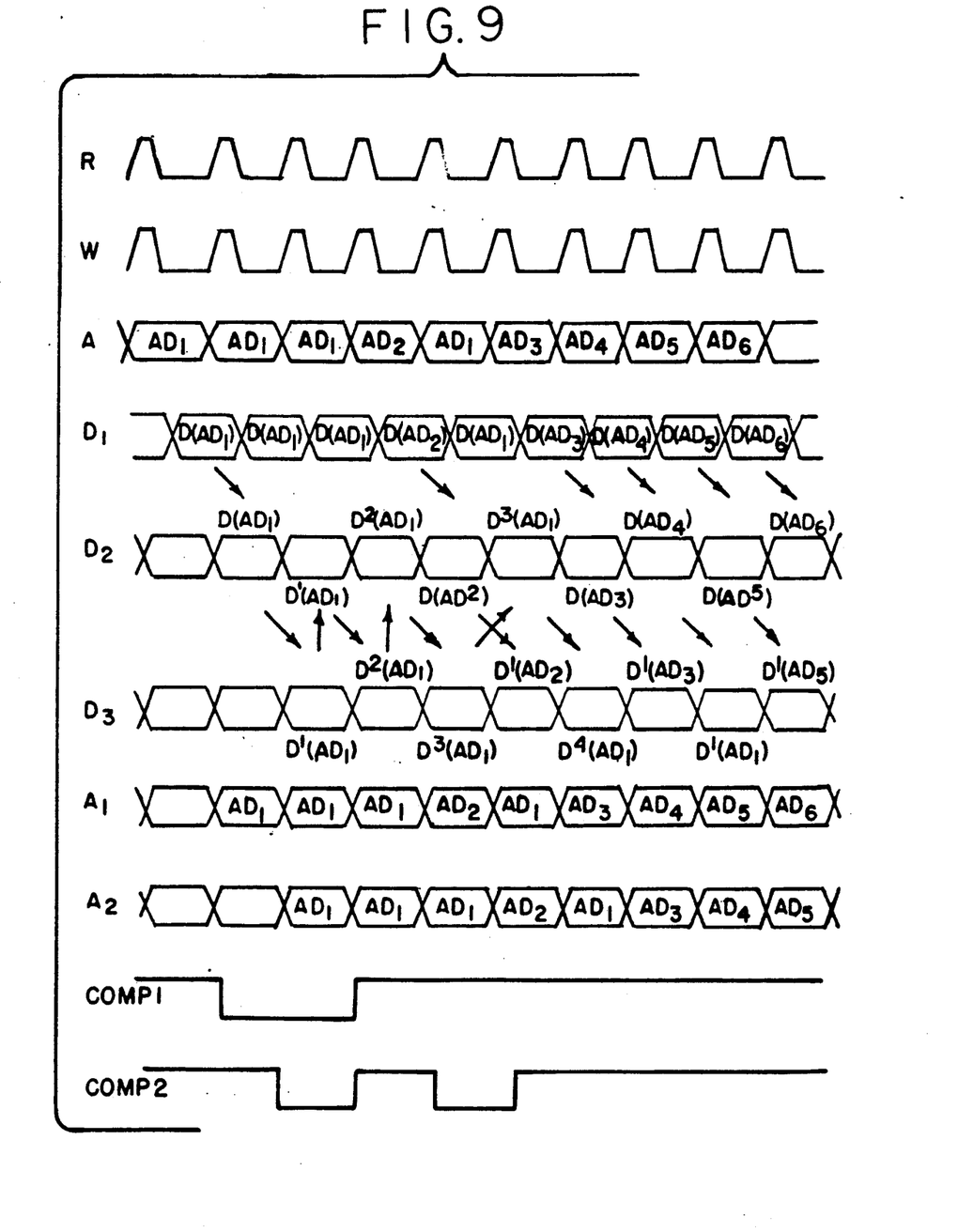
FIG. 9 shows a timing chart of the third embodiment.

FIG. 9 shows a timing chart of the third embodiment of the counter portion. In FIG. 9, address AD1 is designated in the first three cycles, address AD2 is designated in the fourth cycle, address AD1 is designated again in the fifth cycle, address AD3 and AD4 are designated in the sixth and seventh cycles respectively. Hereafter, data in address ADi is designated by a reference D(ADi). The calculation result of j calculation times is designated by a reference Dj(ADi).

When the second designation of AD1 after the first D(AD1) is held in the latch 12, COMP1 becomes a low level. The calculation result of the light computational portion 9 is fed through the feedback line F back to the multi-plexer 11. The calculation result of three calculation times D3(AD1) is output from the latch 13. When another address AD2 is designated, COMP1 becomes a high level and COMP2 becomes a low level. It causes the selection of data from the feedback line F'. As soon as the data D1(AD2) is held in the latch 13, D3(AD1) is fed to the latch 12 and held therein. In the next cycle, D1(AD2) is written in the address AD2, simultaneously D3(AD1) is input again to the light computational portion 9.

In this embodiment, since the high speed memory has the performance of simultaneous reading and writing, the basic cycle is half of that of the first embodiment. In the critical timing of repeated designations of the same address, repeated calculation can be executed, as well.

When the light computational portion has functions of MAX, MIN and other calculations, maximum extraction, minimum extraction and various calculations can be executed. Since the light computational portion performs, in one cycle, a rather light calculation, the light computational portion can be very fast in processing. Processing at video rates can be easily performed.

Although only a few exemplary embodiments of this invention have been described in detail above, those skilled in the art will readily appreciate that many modifications are possible in the exemplary embodiments without materially departing from the novel teachings and advantages of this invention.

Accordingly, all such modification are intended to be included within the scope of this invention as defined in the following claims.

What is claimed is:

1. An image processing method comprising steps of:
   storing pixel density values of an original image;
   generating a shifted image by shifting the pixel density values of the original image by a predetermined distance;
   generating a set of counts, each count corresponding to a selected density value, each count being a number of times that a pixel in the shifted image equals selected density value simultaneously with a corresponding pixel in the original image equaling a predetermined value.

2. An image processing method according to claim 1 further comprising the steps of:
   changing the predetermined value through a range; and generating a matrix, each vector of the matrix corresponding to a different predetermined value, each scalar entry corresponding to count for a selected density.

3. An image processing method according to claim 1, further comprising the steps of:
   sequentially processing corresponding pairs of points, one from the original image and one from the shifted image;
   generating a partial count for a selected density value; and
   incrementing the partial count each time a pixel in the shifted image equals the selected density simultaneously with a corresponding pixel in the original image equaling a predetermined value.

4. A method as in claim 2 further comprising the steps of:
   generating a second shifted image by shifting the pixel density values of the original image by a second shift distance;
   generating a second matrix corresponding to the second different shift distance.

5. A method as in claim 2 further comprising at least one of the following steps:
   recognizing a texture of a region of the original image from the matrix;
   recognizing a contrast of a region of the original image from the matrix.

6. An image processing system comprising:
   first memory means for storing pixel density values of an image;
   second memory means for storing pixel density values of the image in an order shifted with respect to the order of the first memory means, pixel density values in the second memory means corresponding to pixel density values in the first memory means;
   reading means connected to the first and second memory means for successively reading corresponding pixel density values from the first and second memories;
   comparator means connected to the first memory means for generating a flag signal when a pixel density value read from the first memory equals a predetermined value;
   counting means connected to the comparator means and to the second memory for generating a set of counts, each count corresponding to a selected density value, each count being a number of times that a pixel in the shifted image equals the selected density value simultaneously with a corresponding pixel value in the original image equaling the predetermined value.

7. A system as in claim 6 further comprising sequencing means for sequencing the predetermined value and for generating a plurality of sets of counts, one set for each predetermined value and for generating a matrix having vectors corresponding to predetermined values and scalar entries corresponding to counts.

8. A system as in claim 6 wherein the counting means comprises:
   high speed memory means for storing count values; and
   computational means having an input connected to the output of the high speed memory means and having an output connected to the input of the high speed memory means for incrementing the values read from the high speed memory and for storing the incremented values.

* * * * *